United States Patent [19]
Walton

[11] Patent Number: 6,045,124
[45] Date of Patent: Apr. 4, 2000

[54] CABLE PULLEY DEVICE

[75] Inventor: Newton C. Walton, North Wilkesboro, N.C.

[73] Assignee: Data Connections, Inc., Greensboro, N.C.

[21] Appl. No.: 09/005,678

[22] Filed: Jan. 12, 1998

Related U.S. Application Data

[63] Continuation-in-part of application No. 08/415,856, Apr. 3, 1995, Pat. No. 5,618,031, and a continuation of application No. 08/617,103, Mar. 18, 1996, Pat. No. 5,735,505.

[51] Int. Cl.⁷ .................................................. B65H 59/00
[52] U.S. Cl. .................................................. 254/134.3 PA
[58] Field of Search ................................... 254/388–404, 254/410–414, 134.3 PA, 134.3 R, 405, 403; 24/16 PB, 17 AP, 30.5 P, 115 L, 129 A

[56] References Cited

U.S. PATENT DOCUMENTS 516,268   3/1894   Hartz .
2,181,072  11/1939  Sayers .
2,858,106  10/1958  Anton et al. .
3,819,154   6/1974  Miller .............................. 254/134.3 PA

*Primary Examiner*—Robert C. Watson

[57] ABSTRACT

A lightweight cable pulley device and method provides ease and convenience in offices and other buildings during the installation of sensitive data transmission cable such as termed "Category 5" or fiber optic. The pulley device is suspended by an integral strap and the cable supported therefrom by a single installer without the necessity of a helper to pass the cable around turns or obstacles in the path. A pulley wheel is rotatably attached to an axle which is affixed to the strap at one end, with the other end positionable through a pair of strapped catches proximate the wheel. The cable guide is attached to the inside of the strap above the wheel to allow the cable to securely pass between the wheel and the guide.

13 Claims, 8 Drawing Sheets

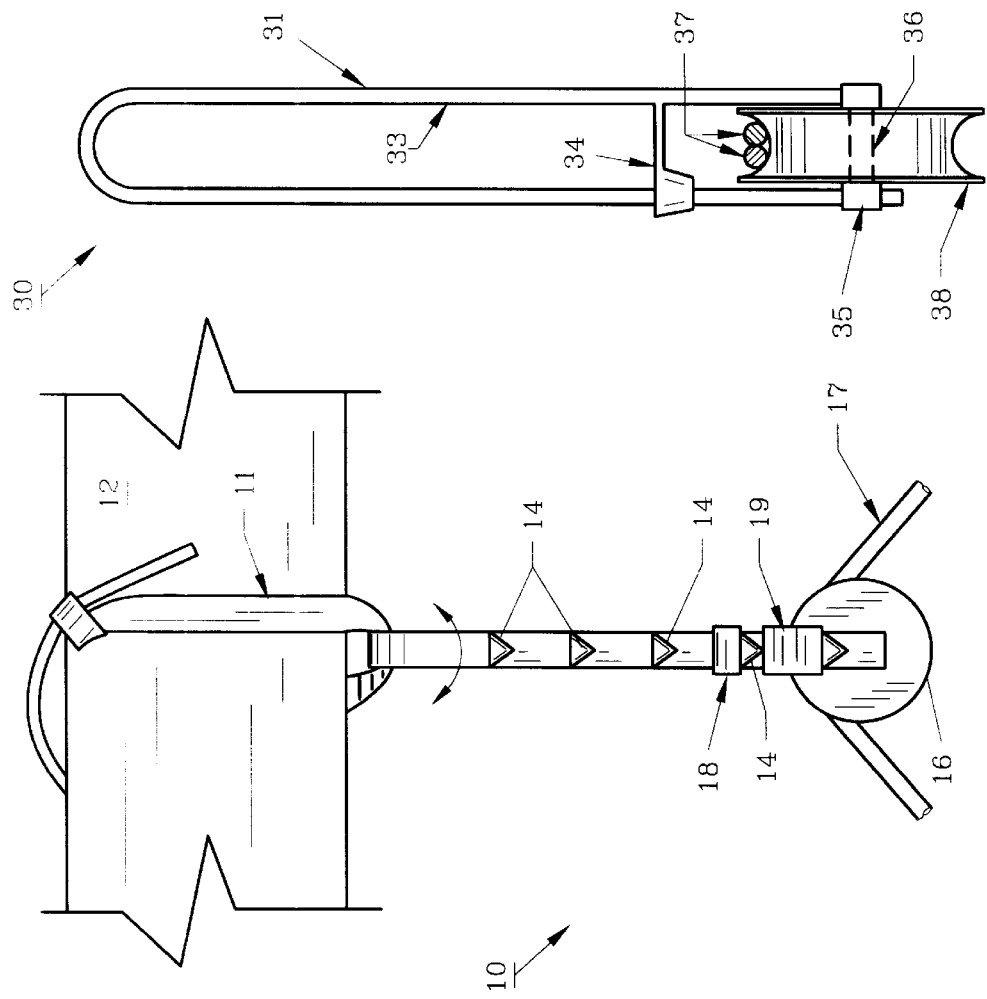
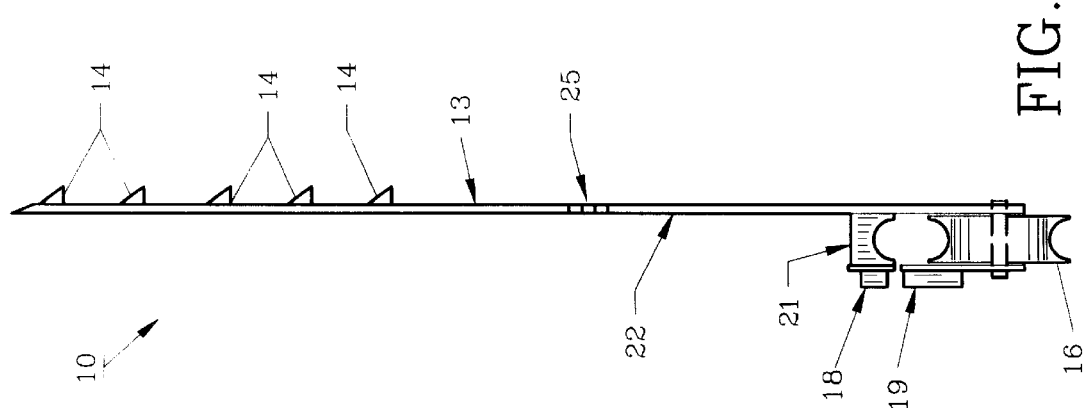

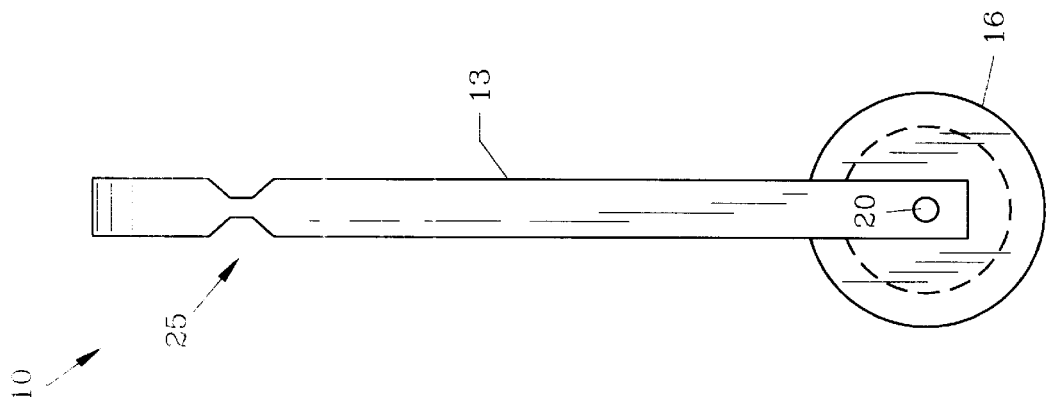
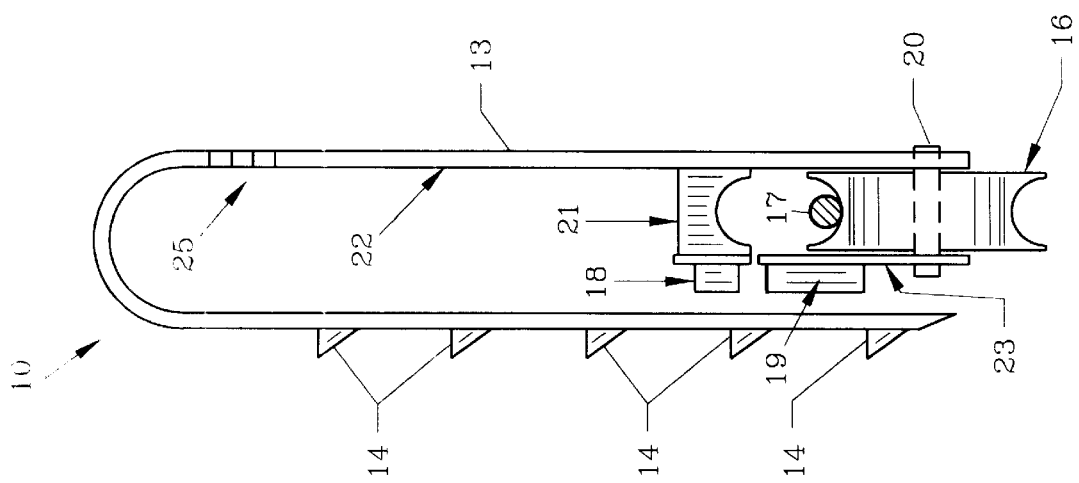

CABLE PULLEY DEVICE

This is a Continuation-in-Part of prior patent application Ser. No. 08/415,856 filed Apr. 3, 1995 now U.S. Pat. No. 5,618,031 and a continuation of application Ser. No. 08/617,103 filed Mar. 18, 1996 now U.S. Pat. No. 5,735,505.

BACKGROUND OF THE INVENTION

1. Field of the Invention

The invention herein pertains to installing cable in office buildings and other structures and particularly pertains to installing sensitive data communications cables such as identified as Category 5 or fiber optic, utilizing a lightweight pulley device by one installer.

2. Background and Objectives of the Invention

With the increased use of computers, computer terminals, facsimile machines, and other electronic data generating devices, existing office buildings are beg retrofitted with data communications cables for internal data transmissions. In addition, new buildings are now frequently being wired with data transmission cables to allow communications from floor to floor and office to office within. Modern data communications cables are unlike conventional electric supply wires in that data transmission cables are manufactured with specific dimensions to ensure proper data flow with minimum interference. For example, Category or level "5" cable usually consists of four (4) pairs of intertwined copper wires which should not be bent to a diameter less than ten times the cable diameter. In addition, fiber optic cables are likewise sensitive to sharp bends, turns and other stresses which can affect their diameter and thus distort data transmission.

During wiring of buildings, whether with data cables such as Category 5 or with optical fiber cable, installers usually work in pairs in order to direct the sensitive cables along or around joists, rafters, and other structural components. The use of "teams" of installers is expensive with one team member often being idle for extended periods during the installation process. In addition, installers must be extremely careful in turning corners and in pulling cables from one level to another so that the cables are not unduly stressed or deformed. Consequently, with conventional techniques employed in installing fiber optic or other sensitive data communications cables, problems have arisen requiring the cables to be removed and reinstalled at a later date at great time and expense.

With the disadvantages and problems associated with conventional installation devices and techniques, the present invention was conceived and one of its objectives is to provide a data communications cable pulley device and method which will facilitate cable installation during building construction and retrofitting procedures.

It is another objective of the present invention to provide a lightweight cable pulley device which includes a pulley wheel and adjustable flexible strap attached thereto for suspending sensitive data communications cable.

It is yet another objective of the present invention to provide a cable pulley device which can be easily pivotally fastened to a variety of supports.

It is still another objective of the present invention to provide a method of installing data communications cable whereby the aforementioned pulley device is employed by a single installer.

It is also another objective of the present invention to provide a cable pulley device which is formed from lightweight, polymeric materials which are relatively inexpensive to manufacture and purchase.

Various other advantages and features of the invention will become apparent to those skilled in the art as a more detailed description is set forth below.

SUMMARY OF THE INVENTION

The invention herein provides a pulley device and method whereby sensitive data communications cable can be installed in office buildings and the like by a lone installer easily and without damage to the cable. A lightweight pulley device is provided having a pulley wheel attached to a closable strap. The strap includes a plurality of latches that are positioned along the flexible strap whereby the strap can be adjustably fastened to a stringer or other rigid support to hold the pulley in a desired position. A pulley guide is affixed to the strap for latching purposes. In one embodiment of the invention, the flexible strap includes a designated break area whereby excess force on the pulley device, such as by overstretching the communications cable, will cause the strap to break and prevent damage to the communications cable during installation. In another embodiment of the invention, the flexible strap utilizes a conventional "tie-wrap" configuration.

BRIEF DESCRIPTION OF THE DRAWINGS

FIG. 1 demonstrates the preferred form of the pulley device of the invention affixed to a building structural component.

FIG. 2 depicts the pulley device as shown in FIG. 1 unattached and in an open posture;

FIG. 3 shows a right side view of the pulley device shown in FIG. 2;

FIG. 4 pictures the pulley device of FIGS. 1–3 with the strap in a linear posture;

FIG. 7 demonstrates a front view of the pulley device as shown in FIG. 6 with a pair of cables therein;

DESCRIPTION OF THE PREFERRED EMBODIMENTS AND OPERATION OF THE INVENTION

Figure 6:
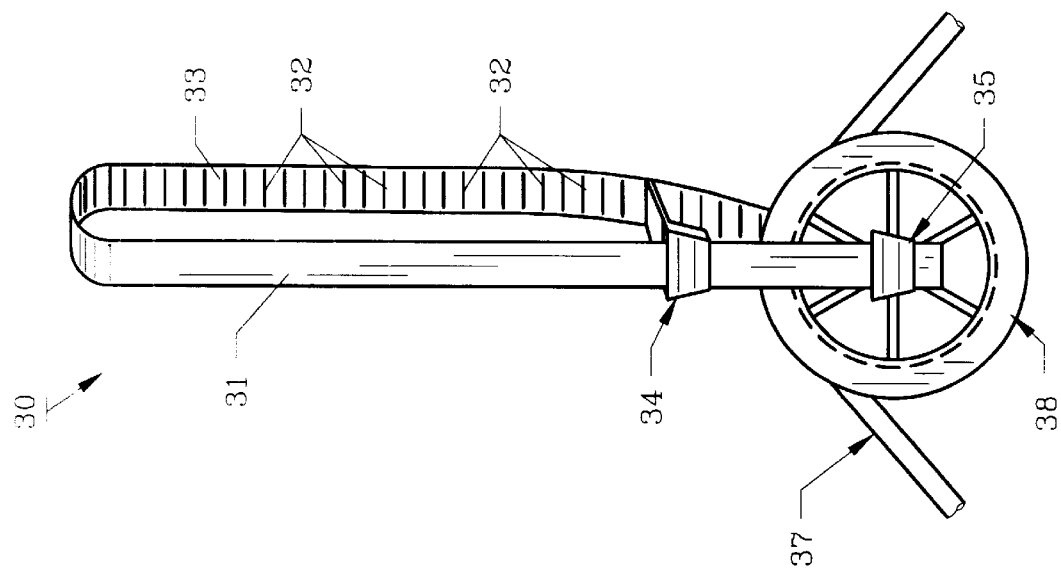
FIG. 6 illustrates yet another embodiment of the pulley device.

For a better understanding of the invention and its use, turning now to the drawings, FIG. 1 illustrates the preferred form of cable pulley device 10 which is pivotally attached by conventional tie strap 11 to stringer 12 which may be, for example, a wooden 2"×4" as conventionally used for construction purposes. As shown, pulley device 10 may be formed entirely of a polymeric material such as nylon, polypropylene, or other suitable plastics. Pulley device 10 includes flexible strap 13 having a plurality of latches 14 therealong which are somewhat wedge-shaped and extend from the outer surface 15 of flexible strap 13. When used, pulley device 10 prevents a damaging acute angle being formed in cable 17 due to the relatively large diameter of pulley wheel 16 as compared to the diameter of cable 17. Typical data communications cable may be identified as Category 5 cable or optical fiber cable.

First strap catch 18 is shown in FIG. 1 above pulley wheel 16 and a second strap catch 19 is affixed proximate the top of pulley wheel 16. In FIG. 2, cable pulley device 10 is shown in an open form prior to attachment to a stringer or other building component. As further seen, pulley wheel 16 is attached to flexible strap 13 by axle 20 passing therethrough. As would be understood, pulley wheel 16 is rotatably on axle 20 to allow cable 17 (FIG. 1) to move easily therealong. Cable guide 21 is mounted to inside surface 22 of flexible cable 13 with first strap catch 18 affixed thereto. Second strap catch 19 is joined to cable axle 20 through intermediate vertical strap catch support 23.

In the event cable 17 is pulled against pulley device 10 with a force of sufficient magnitude to damage cable 17, a safety feature is provided in the form a thin or weak area in strap 13. This inherent weak area is termed a "designated break area", as shown at 25 in FIGS. 2 and 3. Break area 25 is of lesser diameter and has been calculated, based on the tensile strength of strap 13, to break when a predetermined force is applied, and therefore release cable 17 before damage such as stretching of cable 17.

Figure 5:
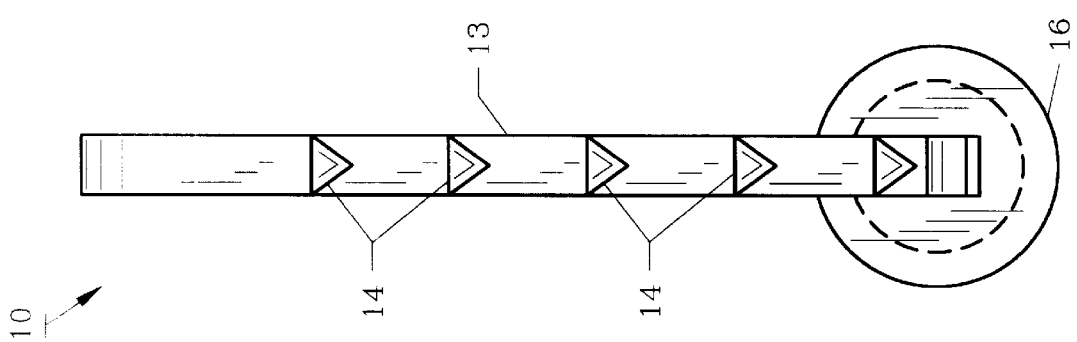
FIG. 5 features another side view of the pulley device as shown unopened as in FIG. 2.

FIG. 4 illustrates pulley device 10 with flexible strap 13 fully opened prior to placement around stringer 12 or the like as shown in FIG. 1. Wedge-shaped latches 14 as would be understood are flexible allowing easy placement through first strap catch 18 and second strap catch 19 as shown. In FIG. 5, a front view of pulley device 10 is shown in open form as illustrated in FIG. 2.

Pulley device 10 is preferably utilized by a lone installer, as no help is required to feed communications cables or lines around corners or turns. Instead, flexible strap 13 is attached as shown in FIG. 1 to provide universal pivoting action and with cable 17 positioned between cable guide 21 and wheel 16, cable 17 can then be pulled therealong through various turns and angles without fear of stretching, injuriously bending, or otherwise damaging cable 17.

In FIG. 6 another embodiment of the invention is illustrated whereby pulley device 30 is shown in a side elevational view. Flexible strap 31 is provided with teeth 32 along inside strap surface 33 as also shown in FIG. 7. Teeth 32 are of the conventional type as shown along tie strap 11 in FIG. 1 and do not protrude from strap 31 as do wedge-shaped latches 14 positioned on strap 13 as seen in FIGS. 1–5. As further shown in FIG. 7, first strap catch 34 is affixed to inside surface 33 of flexible strap 31 and as understood, first strap catch 34 maintains strap 31 in place as teeth 32 easily slide into and through first catch 34 and second catch 35, but strap 31 prohibits withdrawal. Second strap catch 35 is affixed to pulley wheel axle 36 and is so positioned to maintain strap 31 against the side surface of pulley wheel 38. With strap 31 so placed, each cable 37 is prevented from exiting the confinement provided by first strap catch 34, pulley wheel 38 and along the sides by flexible strap 31. As hereinbefore mentioned, pulley device 30 can be formed entirely of a conventional lightweight polymeric material whereby an installer can easily carry a number of pulley devices 30 without undue effort or inconvenience.

Figure 8:
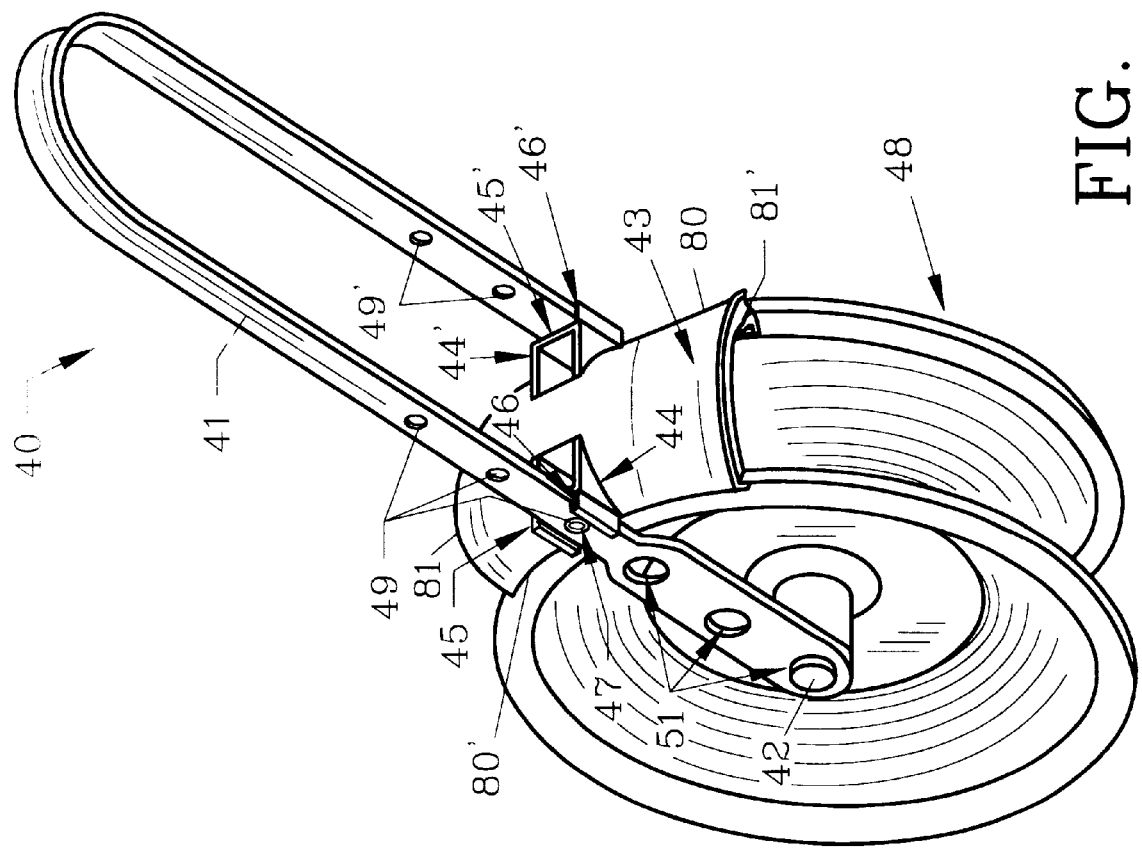
FIG. 8 pictures a perspective view of another embodiment of the invention having a pulley fender.

A third embodiment of the invention is seen in FIG. 8 whereby pulley device 40 includes a flexible strap 41 affixed to pulley axle 42. Pulley fender 43 has sides 80, 80' which extend along the periphery of pulley wheel 48 and has an arcuate cross-section and is slidably positioned on strap 41 and acts as a cable guide to prevent cable 50 (FIG. 12) from inadvertently slipping from pulley wheel 48. As would be understood, pulley device 40 is usually turned and twisted in a variety of positions as cable 50 is installed and fender 43 prevents cable 50 from inadvertently detaching from pulley device 40. Flexible strap 41 and fender 43 are molded from conventional plastics as is wheel 48.

Figure 9:
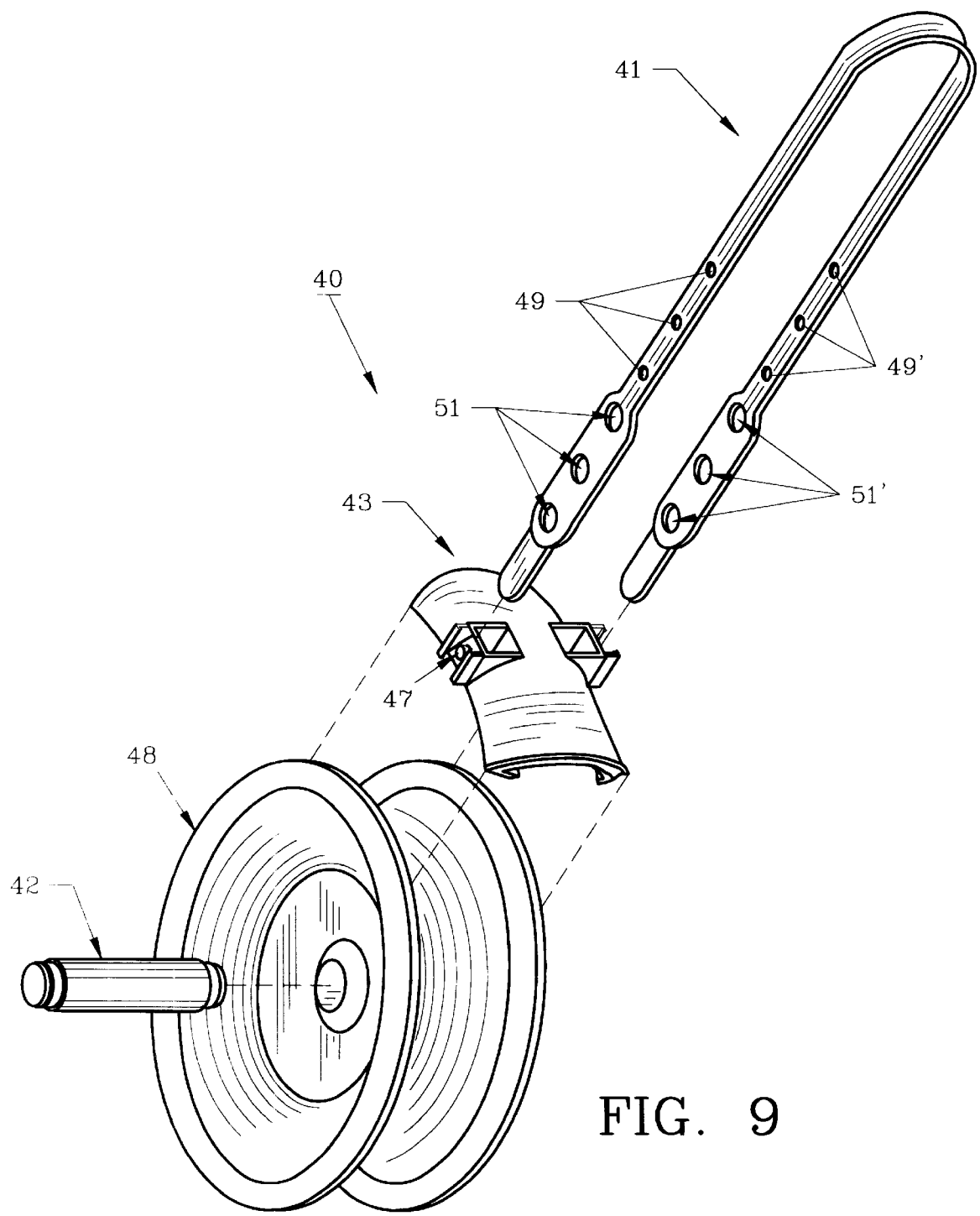
FIG. 9 features the pulley device of FIG. 8 shown in exploded form.
Figure 11:
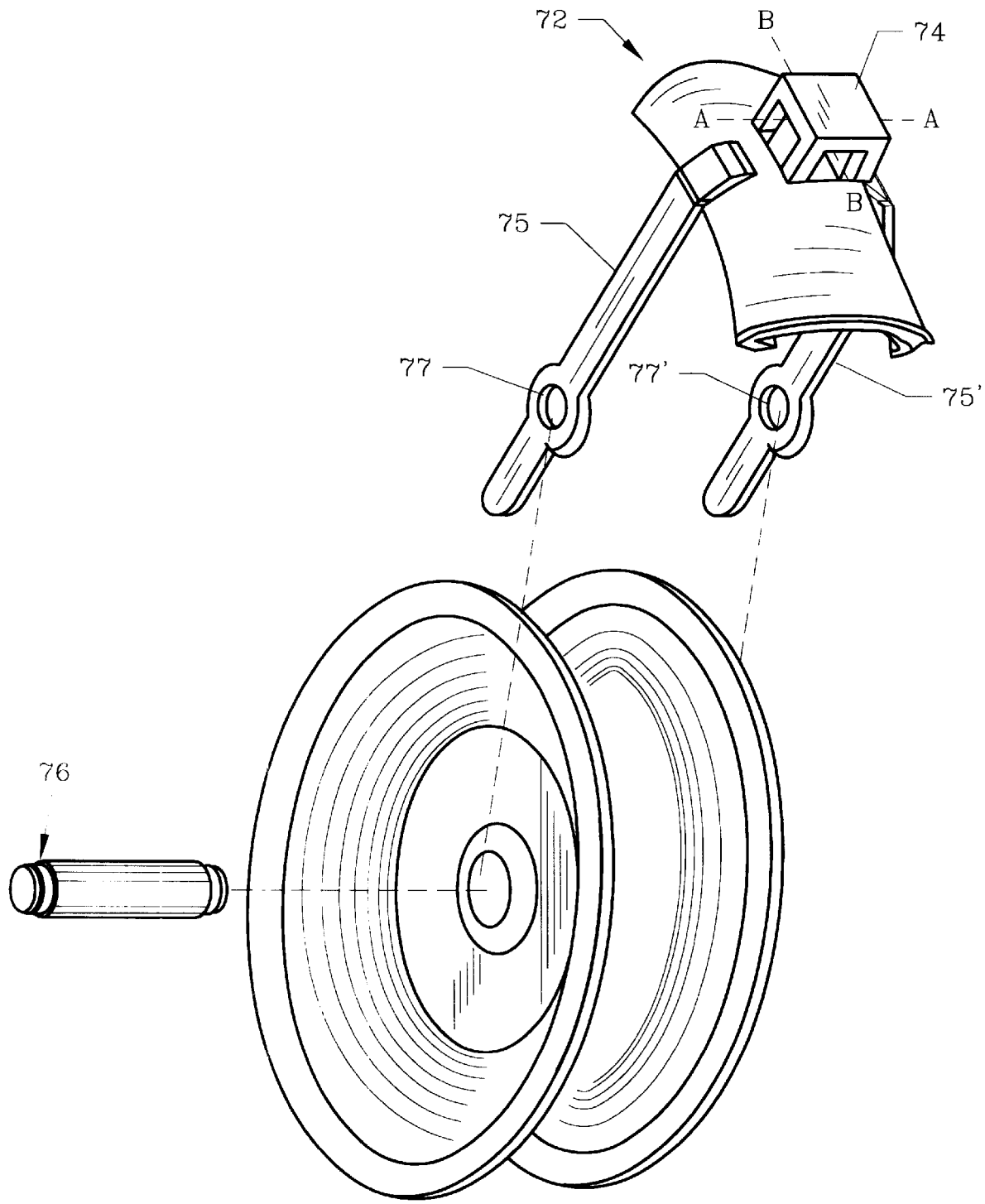
FIG. 11 shows the pulley fender as seen in FIG. 10 removed from the pulley device.

Pulley fender 43 includes a pair of strap brackets 44, 44' which include strap slots 45, 46, 45', 46' respectively. Bracket studs 47, 47' (not shown) are attached to pulley fender 43 within brackets 44, 44' and help secure flexible strap 41 to pulley fender 43. As shown in FIG. 8, strap 41 includes a plurality of apertures 49, 49' for selectable attachment to respectively, bracket studs 47, 47'. Flexible strap 41 is joined to grooved pulley axle 42 by apertures 51, 51', seen also in FIG. 9. Thus, during cable installation, with flexible strap 41 positioned on a joist 60 as shown in FIG. 11, fender 43 will prevent cable 50 from escaping the confines of wheel 48.

Figure 10:
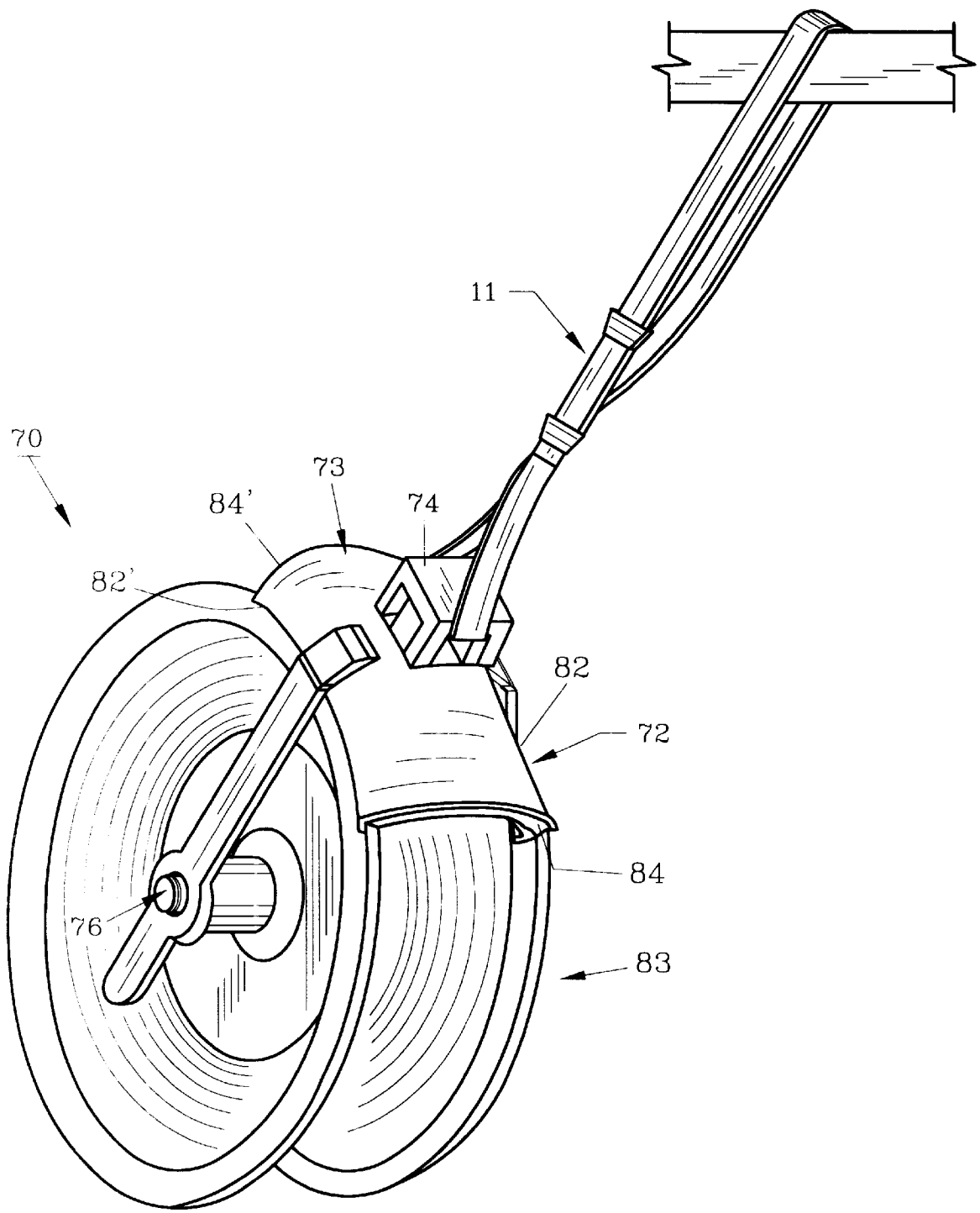
FIG. 10 depicts a perspective view of still another embodiment of the invention.

A further embodiment of the invention is shown in FIG. 10 wherein pulley device 70 is shown suspended by conventional tie strap 11. Pulley device 70 includes pulley fender 72 has sides 82, 82' which extend along the periphery of pulley wheel 83 and are contiguous thereto. Pulley fender 72 also has ends 84, 84' which are perpendicular to the axis of rotation of pulley wheel 83 and are spaced from flexible strap 11 and each other. Ends 84, 84' span the entire width of pulley wheel 83. Pulley fender 72 which also acts as a cable guide. As seen, fender 72 includes an arcuate cover 73 and a suspension strap protuberance 74. Protuberance 74 is open to allow conventional tie strap 11 to pass therethrough in an axial direction as shown along lines A—A or perpendicularly thereto along lines B—B for convenience in hanging as seen in FIG. 11. A pair of radial pulley straps 75, 75' are affixable to grooved axle 76 through apertures 77, 77'.

Figure 12:
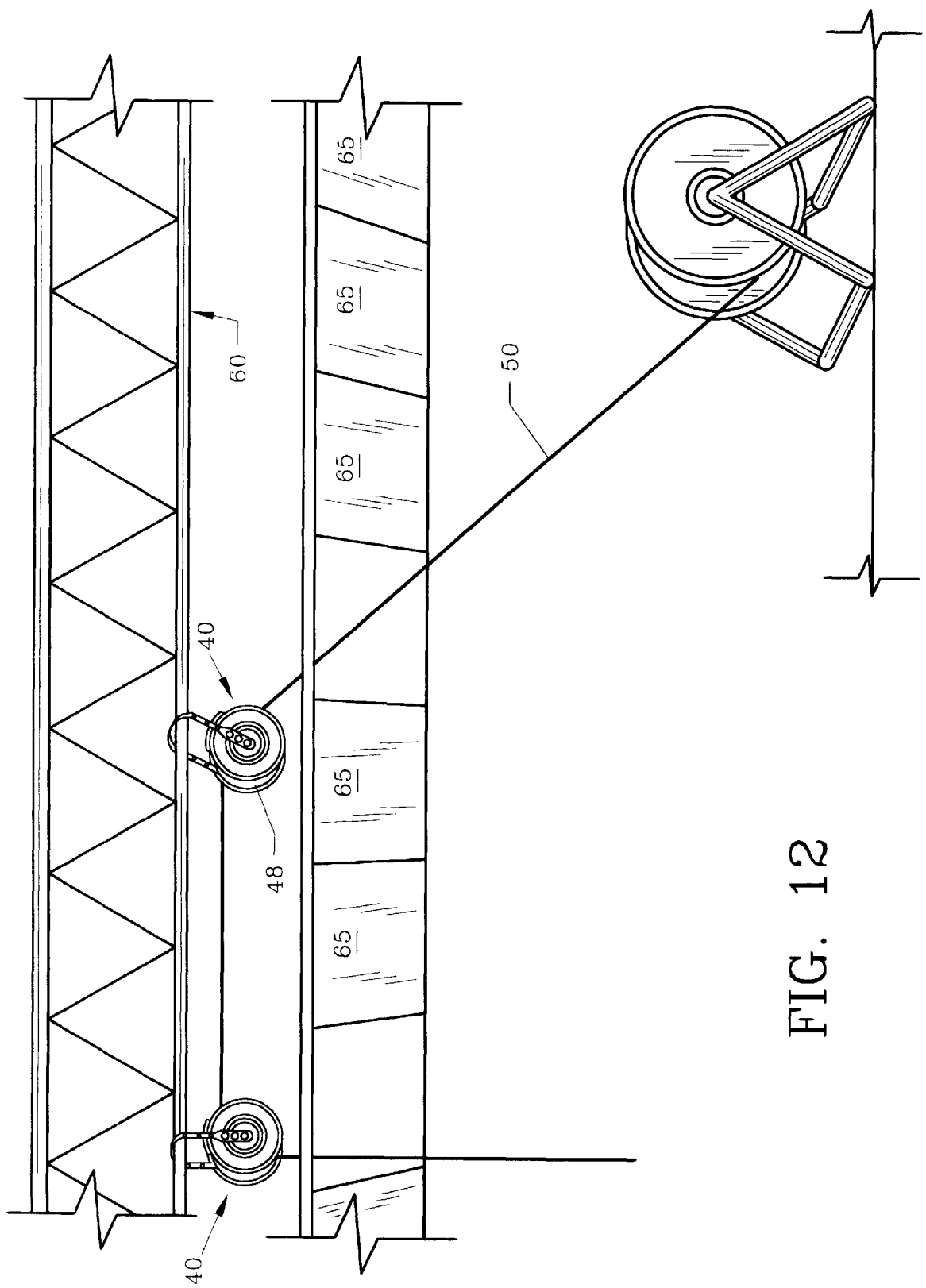
FIG. 12 demonstrates a schematic view of a cable installation within an attic area of an office building.

In FIG. 12, a typical pulley device installation is shown whereby metal roof joist 60 is used to hang pulley devices 40 by removing one or more ceiling tiles 65 as shown. Cable 50 can then be installed easily for data transmission or the like in the office building.

While the embodiments of the invention described in FIGS. 1–10 are formed of a conventional polymeric material, the pulley devices may be formed of metal or other materials suitable for plenum or non-plenum uses, as necessary. Other sizes and diameters of the pulley wheels may also be provided, depending on the exact cable type and size and the specific embodiments and examples shown herein are not intended to limit the scope as defined by the appended claims as other embodiments and equivalents are anticipated.

I claim:

1. A cable pulley device comprising:
   a) a flexible strap;
   b) a cable guide, said cable guide comprising a pair of sides, each of said sides being arcuately shaped, said flexible strap adjustably attached to said cable guide; and
   c) a wheel, said wheel contiguous to said cable guide, said cable guide spanning the entire width of said wheel.

2. The cable pulley device of claim 1 wherein said cable guide extends along said wheel circumference and wherein said cable guide has a pair of ends, said pair of ends parallel to the axis of rotation of said wheel and spaced from said flexible strap.

3. The cable pulley device of claim 1 further comprising a strap protuberance, said protuberance allowing said flexible strap to pass therethrough.

4. The cable pulley device of claim 1 further comprising an axle, said axle extending through said wheel.

5. The cable pulley device of claim 3 further comprising a radial pulley strap, said radial pulley strap connecting said cable guide to said axle.

6. The cable pulley device of claim 1 wherein said flexible strap is formed from a polymeric material.

7. The cable pulley device of claim 1 wherein said cable guide is arcuately shaped.

8. The cable pulley device of claim 1 wherein said cable guide includes a pair of sides, said pair of sides perpendicular to the axis of rotation of said wheel.

9. A cable pulley device comprising: a flexible strap, a wheel, said strap attached to said wheel, a cable guide, first and second strap brackets, said first and second strap brackets attached to said cable guide, said cable guide spanning the entire width of said wheel, said cable guide having a pair of sides, said pair of sides perpendicular to the axis of rotation of said wheel, said pair of sides attached to said flexible strap contiguous to said wheel to maintain a cable between said cable guide and said wheel.

10. The cable pulley device of claim 9 wherein said cable guide extends along said wheel circumference and wherein said cable guide has a pair of ends, said pair of ends parallel to the axis of rotation of said wheel and spaced from said flexible strap.

11. The cable pulley device of claim 9 wherein said flexible strap defines an axle aperture.

12. The cable pulley device of claim 9 wherein said first strap bracket comprises a stud.

13. The cable pulley device of claim 9 wherein said first strap bracket comprises a guide.

\* \* \* \* \*